March 17, 1925.
J. McKEE ET AL
GREASE FOR MECHANICAL LUBRICATION
Filed July 29, 1921
1,529,658
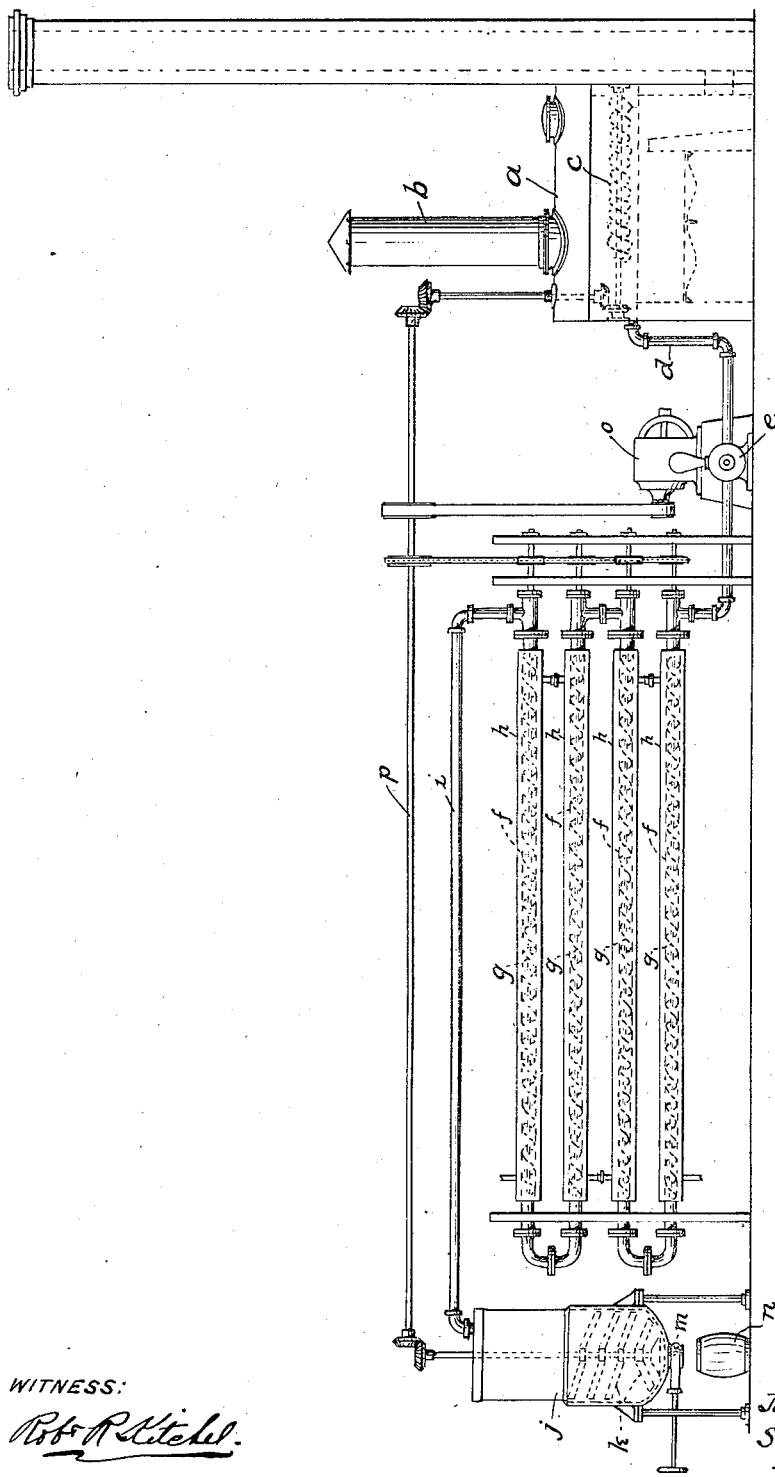
WITNESS:
INVENTORS
James McKee and
Samuel B. Eckert
BY
Frank J. Busser
ATTORNEY.

Patented Mar. 17, 1925.

1,529,658

UNITED STATES PATENT OFFICE.

JAMES McKEE, OF CHESTER, AND SAMUEL B. ECKERT, OF DEVON, PENNSYLVANIA, ASSIGNORS TO SUN OIL COMPANY, OF PHILADELPHIA, PENNSYLVANIA, A CORPORATION OF NEW JERSEY.

GREASE FOR MECHANICAL LUBRICATION.

Application filed July 29, 1921. Serial No. 488,271.

*To all whom it may concern:*

Be it known that we, JAMES McKEE and SAMUEL B. ECKERT, citizens of the United States, residing at Chester, county of Delaware, and State of Pennsylvania, and at Devon, county of Chester, State of Pennsylvania, respectively, have invented a new and useful Improvement in Grease for Mechanical Lubrication, of which the following is a full, clear, and exact description, reference being had to the accompanying drawings, which form a part of this specification.

The object of our invention is to provide a grease for mechanical lubrication that, in its combined qualities, is superior to ordinary grease and more economical of manufacture. Inasmuch as the manufacture of the grease seems to involve the employment of a process substantially different from that used in the manufacture of ordinary grease, we shall herein describe not only its composition but also the method by which it has been successfully manufactured on a commercial scale. Such process, however, is not herein claimed, but forms the subject-matter of a separate application filed by us July 29, 1921, Serial No. 488,272. The composition forming the subject-matter of the present application is not, therefore, limited to any particular process of manufacture.

The invention comprises an admixture of unsaponifiable mineral oil, a saponified fatty acid derivative from mineral oil of the character hereinafter described, and a saponified animal or vegetable oil; the product being a grease of desirable density which is neutral in reaction, free from moisture, that does not decompose and preserves its lubricating qualities during and after exposure to a temperature in excess of the boiling point of water, that preserves its viscosity at a temperature of thirty degrees or more below zero Fahrenheit, that does not oxidize, and that does not leave a hard or soapy residue after prolonged exposure.

The preferred total proportion of the saponified ingredients is not necessarily different from that characteristic of ordinary greases, although preferably such proportion slightly exceeds that of the saponified vegetable or animal oil used in ordinary greases. Due to the fact that a saponified mineral oil derivative is used in partial substitution for a saponified animal or vegetable oil and that such derivative is substantially cheaper than any ordinarily available vegetable or animal oil, a material saving in cost of production is effected. There is no practical minimum limit to the percentage of vegetable or animal oil and we have succeeded in producing efficient greases which contain no ingredient whatever of vegetable or animal oil; but such greases do not have the density that is ordinarily desirable.

The saponifiable mineral oil derivatives that we have found available are the products known as "Maitland fatty acids," which are water-insoluble, practically odorless, do not become rancid, contain a very low percentage of sulfur, usually much less than one per cent, and when saponified being soluble in all proportions with water and wholly or partially soluble in mineral oil and adapted to undergo the character of hydrolytic decomposition that occurs with soaps derived from animal and vegetable oil.

The Maitland product that we prefer to use is a liquid and when saponified entirely soluble in all proportions with mineral oil. It is prepared by distilling from crude petroleum a relatively heavy distillate adapted for lubricating oil stock, treating the same with a mineral acid preferably sulphuric acid and separating out the precipitated sludge with a large part of the acid, treating the remaining body of acid-containing oil with an alkali, separating out the precipitated soap and alkaline salt water, decomposing the soap with a relatively weak solution of a mineral acid and eliminating most of the salt water.

Another Maitland product that may be less preferably used is solid at ordinary temperatures and when saponified only partially soluble in mineral oil. It is made by subjecting the sludge produced in the process above described to a mechanical mastication and concurrent washing with hot water that is continuously freshly supplied and flows upwardly through the mass of the sludge and continuously outflows at the top.

These saponifiable derivatives from mineral oil and certain processes of making them are more specifically described in the Maitland Patents No. 1,425,882, No. 1,425,883, No. 1,425,884 and No. 1,425,885, all issued August 15, 1922. Patents No. 1,425,882 and No. 1,425,884 set forth the Maitland product specified above as preferable and the preferred process of making such product. As stated in the specifications of Patents No. 1,425,882 and No. 1,425,884, the saponified fatty acids produced by the process therein described are admixed with more or less mineral lubricating oil, the percentage of which will vary more or less. It is this product, which may or may not be produced by the process described in the last named patents, which we utilize in the manufacture of our improved grease. There is no occasion, in using this product, to separate the mineral lubricating oil from the fatty acids, because our new product contains both fatty acids and lubricating mineral oil; but if the fatty acids should be completely separated from the mineral oil, the proportion of fatty acids used in our process would be reduced from the proportion, or range of proportions, herein specified for "Maitland fatty acids." We have herein specified the saponification value of the Maitland fatty acids that we have usually used, from which the preferable proportions of the pure fatty acid can be readily calculated.

We have also found it advantageous, if not necessary, to manufacture the above saponifiable mineral oil derivative from a crude petroleum that contains not over a small proportion of paraffine. The best results are obtained from Gulf Coast crude, which is free from paraffine.

Our experiments with various vegetable and animal oils lead us to believe that any saponifiable vegetable or animal oil is available; and in restricting the claims to a vegetable oil it will be understood that we mean to include animal oil as an equivalent. As examples of workable and satisfactory saponifiable non-mineral oils may be mentioned tallow, horse oil, corn oil and castor oil.

It is impossible to make very definite specifications of permissible percentages of the ingredients mentioned, since it is desirable to make different kinds of grease, each of which is best adapted for a particular lubricating field. These different kinds of grease require considerable variations in percentages of the several ingredients. In all cases, however, the proportion of unsaponifiable mineral oil (which should be refined lubricating oil) is several times that of the other ingredients combined, while the proportion of the saponifiable vegetable or animal oil may vary from a proportion much less than that of the saponifiable mineral oil derivative, to a proportion slightly, but not substantially, in excess of the proportion of the saponifiable mineral oil derivative.

Thus, we have made greases containing from fifteen to twenty per cent of 50 saponification "Maitland fatty acid" with about one per cent of vegetable or animal oil; and on the other hand we have made greases containing approximately nine per cent of 50 saponification of "Maitland fatty acid" and approximately as high as ten per cent of vegetable or animal oil. Usually, however, when the percentage of vegetable or animal oil is reduced, the percentage of "Maitland fatty acid" is increased.

A typical grease that gives excellent results comprises refined lubricating mineral oil, 85%; 50 saponification Maitland fatty acid, 9%; and tallow, 6%.

In the manufacture of our improved grease we have successfully used the apparatus illustrated in the accompanying drawing, which is an elevation, more or less diagrammatic of the same.

The apparatus comprises a grease still $a$ having a vapor stack or vent $b$ and an Archimedean screw agitator $c$. An outflow pipe $d$, in which is interposed a pump $e$, connects with a cooler and agitator. The cooler and agitator comprise a series of pipes $f$, through which the grease is adapted to flow. Each pipe contains an Archimedean screw conveyor $g$ adapted to scrape the inner walls of the pipes. Each pipe is jacketed at $h$ to provide a cold water circulation, adjacent jackets being connected to allow the water to flow from the jacket of one pipe to the jacket of another in the reverse direction to the direction of flow of the grease. The grease outflow pipe $i$ from the cooler and agitator discharges into a water-jacketed agitator and storage tank $j$ equipped with paddles $k$. A valve $m$ regulates the outflow of the finished grease into packages $n$. A motor $o$ drives a main shaft $p$, from which the screw $c$ in the still $a$, the screws $g$ in the pipes $f$, and the paddles $k$ in the storage tank $j$, are driven.

The still $a$ is charged with the proper proportions of an unsaponifiable mineral oil, a saponifiable mineral oil derivative, and a vegetable or animal oil, together with a quantity of an alkali solution, preferably 30 Baumé caustic soda, sufficient to neutralize all the saponifiable matter contained in the complete mixture. Usage will determine the quantity of alkali required. An amount somewhat less than that so determined is first added and thereafter small proportions are added until, by successive titrations, the neutralizing point is found to be reached.

After charging the still, the agitator $c$ is put into motion and fire started under the still. The temperature of the still is slowly raised to slightly above 212 degrees F., at which point the fire is held in check and the moisture resulting from the addition of the soda solution slowly driven off. While the period during which the water is being boiled off and the reaction of alkali and saponifiable material is taking place may be shortened to the actual time required to boil off the water without causing the still to boil over, it is advisable to hold the still at the temperature specified for at least four hours in order to insure complete chemical combination.

After this first reaction and the driving off of all the water, the mixture is raised rapidly to about 340 degrees F., after which the burners are turned off and the mixture pumped out of the still into and through the cooler and agitator. Here the mixture is gradually cooled by the reverse flow of cold water through the pipe jackets $h$. The screws $g$ assist in conveying the grease through the cooler and mix and agitate the grease, and by keeping the inner walls of the pipes $f$ scraped clear of grease, considerably facilitate transfer of heat.

By providing a sufficient length of pipes and screws, the grease may be discharged from the agitator and cooler in a finished condition; but we prefer to discharge the grease into the tank $j$ and there subject it to further agitation and mixing, the paddles $k$ also assisting in forcing the grease through the valved discharge into suitable containers.

The ultimate product is entirely free from moisture. The expulsion of moisture does not, however, sacrifice any advantage whatever that results from the water-content that is present in ordinary grease composed of mineral oil worked into a saponified animal or vegetable oil. The grease may be raised to a temperature substantially in excess of the boiling point of water and indeed to the flash point of the oil without any decomposition of the grease and with no effect upon it except to increase its fluidity. Upon cooling from such a higher temperature, the grease reverts to precisely the condition it was in before heating. Extreme cold effects viscosity only in degree. The density, of course, increases as the temperature is reduced, but it does not become hard, or granular or crystalline in texture. In fact, the grease has a cold test equal, if not superior, to the mineral oil or oils from which it is largely made. Thus, a grease made from a mineral oil having a cold test varying from thirty to forty degrees below zero F. will have the same or a lower cold test. The grease, in its preferred embodiment, is neutral in reaction, it being unnecessary, as in the case of many greases, to carry it well on the alkaline side. The greases do not oxidize and do not leave a hard or soapy residue when left for a prolonged period in small oil passages or when maintained at a high temperature for a long period. This quality is of especial importance when the grease is used for lubricating spring shackle bolts and other elements that are greased only periodically and then left exposed to the air for a prolonged time.

Having now fully described our invention, what we claim and desire to protect by Letters Patent is:

1. A grease for mechanical lubrication comprising an intimate mixture of an unsaponifiable mineral oil, a saponified vegetable oil and a saponified fatty acid derivative of a mineral oil, which does not decompose during and after heating to a temperature above the boiling point of water, which does not oxidize, and which has a cold test at least equal to that of its mineral oil constituent.

2. A grease in accordance with claim 1 which does not decompose when heated up to the flash point of the grease.

3. A grease for mechanical lubrication comprising an intimate mixture of an unsaponifiable mineral oil in preponderating proportion, a saponified vegetable oil and a saponified fatty acid derivative of a mineral oil, the same being free from moisture and substantially neutral in reaction, which does not decompose during and after heating up to the flash point of the grease, which does not oxidize and does not leave a hard or soapy residue when left for a prolonged period in a confined space or when maintained at a high temperature for a prolonged period and which retains viscosity when exposed to a temperature substantially below zero Fahrenheit.

4. A grease for mechanical lubrication comprising a preponderating proportion, not less than eighty per cent, of an unsaponifiable lubricating mineral oil, and not over twenty per cent of a mixture of saponified vegetable oil and a saponified fatty acid derivative from mineral oil.

In testimony of which invention, we have hereunto set our hands, at Phila., Pa., on this 27th day of July, 1921.

JAMES McKEE,
SAMUEL B. ECKERT.